July 10, 1934.                K. L. HERRMANN                1,966,095
                               ROLLER BEARING
                             Filed Nov. 7, 1931
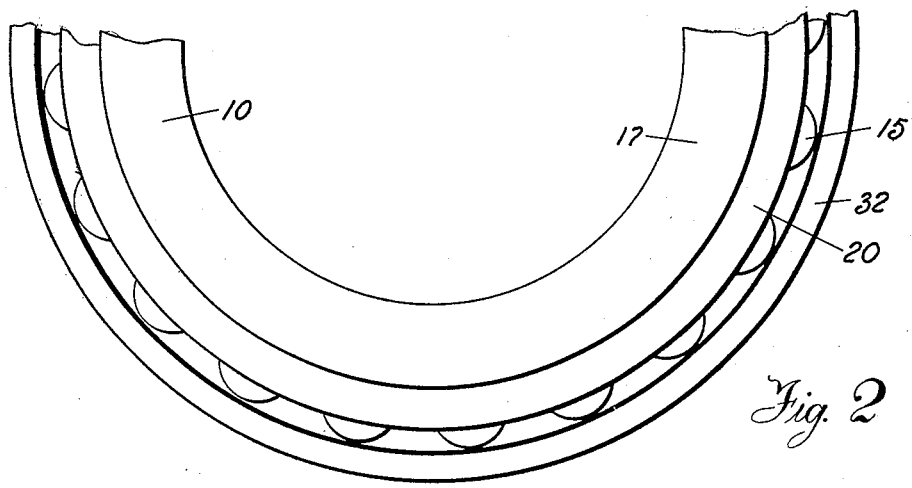
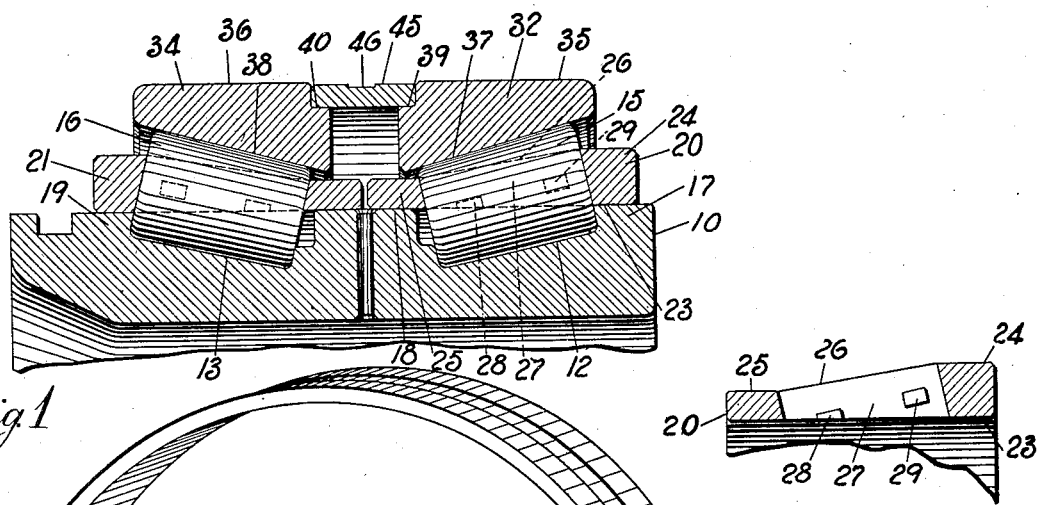
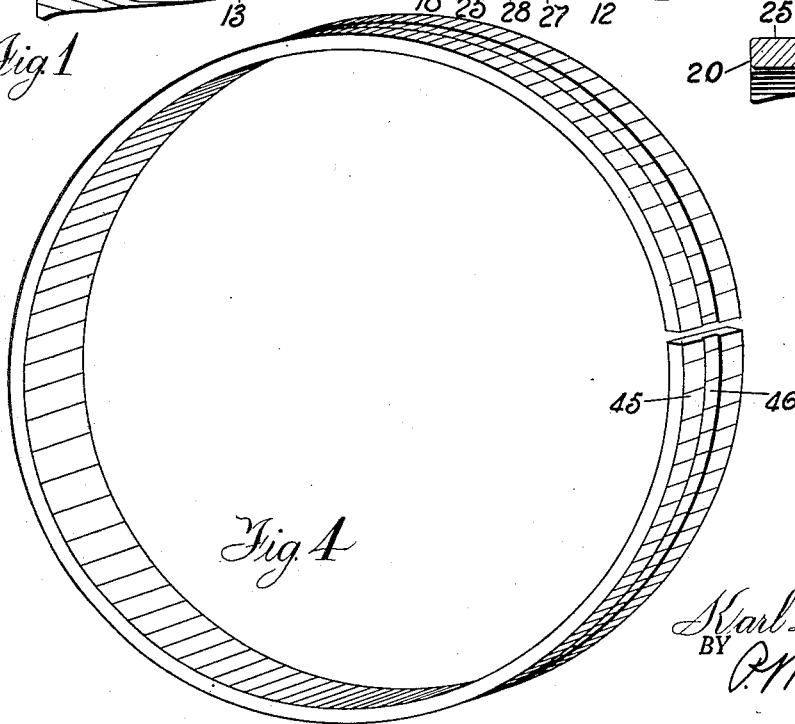
INVENTOR.
Karl L. Herrmann
BY
ATTORNEYS.

Patented July 10, 1934

1,966,095

UNITED STATES PATENT OFFICE 1,966,095

ROLLER BEARING

Karl L. Herrmann, South Bend, Ind.

Application November 7, 1931, Serial No. 573,622

6 Claims. (Cl. 308—214)

This invention relates to a tapered roller bearing, and has for its principal object the provision of a double roller bearing that is easy to assemble and disassemble, yet which is rugged in construction and will not readily get out of adjustment in service.

A further object is the provision of a double roller bearing having a one-piece inner race member which may be machined or ground at a single operation.

A still further object is the provision of a double roller bearing which will run freely and in which there will be no tendency for the rollers to bind against the spacer ring.

It is also an object to provide a double tapered roller bearing of the character described which is simple and economical to manufacture, easy to install and adjust, and which will not readily get out of order in service.

Other objects and advantages will appear as the description proceeds.

The drawing illustrates one mechanical embodiment of the device of the invention. The drawing, however, is not to be taken as limiting the invention, the scope of which is entirely commensurate with the scope of the co-pending claims.

In the drawing:

Figure 1 is a vertical sectional view through a portion of the bearing formed according to the idea of this invention.

Figure 2 is a fragmentary elevational view of the bearing illustrated in Figure 1.

Figure 3 is a vertical sectional view of a portion of one of the spacer rings, and, Figure 4 is a perspective view of the retaining ring mounted between the outer race members.

Referring to the drawing in detail, the numeral 10 indicates an inner race member provided with slanting race-ways 12 and 13 for the tapered rollers 15 and 16. The inner race member 10 is also provided with cylindrical ridges 17, 18 and 19, which form bearing surfaces for the spacer rings 20 and 21.

Referring to Figure 1, it will be observed that the cylindrical ridges 17 and 19 are positioned at the opposite ends of the race member 10 adjoining the outer edges of the race-ways 12 and 13, and that the cylindrical ridge 18 is positioned centrally of the race member 10 between the two race-ways 12 and 13, and is approximately twice the width of the end cylindrical ridges 17 and 19.

The bearing rings 20 and 21 are each provided with an inner cylindrical surface 23 and outer cylindrical surfaces 24 and 25 at the opposite edges thereof, joined by a tapered cylindrical surface 26. Within the tapered portion of the spacer rings 20 and 21 are apertures 27 of approximately the same length as the tapered rollers 15 and 16 and slightly wider than the diameter of the rollers. The lateral surfaces of these apertures are provided with pads 28 and 29 adapted to bear against the rollers and maintain them in spaced and aligned position in the race-ways. The pads 28 and 29 have a comparatively small bearing surface against the rollers and cause materially less friction than if the entire lateral surface of the apertures were allowed to bear against the rollers. These pads are positioned with the outer one 29 somewhat above the inner one 28 so that the pads will lie along the axis of the roller when the spacer ring is positioned on the inner race member as illustrated in Figure 1.

Two outer race members 32 and 34 having cylindrical outer surfaces 35 and 36 and tapered cylindrical inner surfaces 37 and 38 are mounted upon the tapered rollers with the thicker edges thereof projecting toward the center of the bearing. These outer race members are provided with angular cylindrical grooves 39 and 40 and within these grooves there is mounted a split retaining ring 45, a perspective view of which is shown in Figure 4. As illustrated in Figure 4, the retaining ring 45 is simply a flat cylindrical split ring having a circular groove 46 running around the center of the outer surfaces thereof.

In order to assemble this bearing, the spacer rings 20 and 21 are placed in position on the inner race member 10 so that the apertures 27 will lie over the inner race-ways 12 and 13. One ring of roller bearings, 15 for instance, is then formed by placing individual rollers in the apertures in the spacer ring 20. The outer bearing member 32 is then placed in position over the rollers 15 and the other outer bearing member 34 is placed over the spacer ring 21 and moved longitudinally of the bearing until its inner radial surface rests against the inner radial surface of the outer bearing member 32. The individual rollers 16 are then inserted in the apertures in the spacer ring 21 to form the second ring of rollers. After these rollers are placed, the outer bearing member 34 is moved outwardly until its tapered surface 37 contacts the rollers 16. The retaining ring 45 is then slightly spread and forced over one of the outer bearing members 32 or 34 to the center of the bearing. It is then released and owing to its inherent resiliency contracts into the cylindrical grooves 39 and 40 to maintain the outer bearing members 32 and 34 in their proper spaced position and in contact with the rollers 15 and 16 respectively.

If the bearing becomes worn in use, it is not necessary to disassemble the entire bearing in order to make a satisfactory adjustment. The ring 45 is simply removed and a similar ring somewhat wider than the ring 45 is inserted in place thereof. This wider ring will force the outer race members 32 and 34 somewhat further apart where by reason of the tapered inner surfaces of the outer race members and the tapered surfaces of the race-ways in the inner race member, the inner and outer race member will again be brought into contact with the rollers and the bearing will be tight and firm.

Having now described the objects and advantages of my invention so that others skilled in the art may fully understand the same, what I desire to secure by Letters Patent is as follows:

What I claim:

1. In a double tapered roller bearing, an inner race member having cylindrical surfaces at the opposite ends and at the center thereof, tapered race-ways between said cylindrical surfaces, spacer rings having cylindrical inner surfaces and tapered outer surfaces and apertures therein mounted on the cylindrical surfaces of said inner race member, rollers inserted in said apertures, pads on the lateral surfaces of said apertures so positioned as to lie along the axes of said rollers, outer race members having tapered inner surfaces mounted on said rollers, a rectangular cylindrical groove in the inner upper edge of each of said outer race members, and a resilient split ring mounted in said grooves to retain said outer race members spaced from each other and in contact with said rollers.

2. In a double tapered roller bearing, a one-piece inner race member having cylindrical surfaces of substantially the same diameter at the center and adjacent to each end thereof, tapered race-ways between said cylindrical surfaces, apertured spacer members having side rings and integral bars wedge-shaped in cross section between said rings seating on said central and end cylindrical surfaces, tapered rollers in said apertures, outer race members having tapered inner surfaces mounted on said rollers, and means for maintaining said outer race members spaced from each other and in contact with said rollers.

3. In a tapered roller bearing, a one-piece inner race member having cylindrical surfaces of substantially the same diameter at the center and adjacent to each end thereof, inwardly facing tapered race-ways between said cylindrical surfaces, spacer members having rings and spaced means integrally connecting said rings forming roller receiving pockets for each row of rollers, one of said rings seating on said central cylindrical surface and the other of said rings seating on one of said end cylindrical surfaces, rollers in said pockets mounted on said race-ways, and outer race members having tapered inner surfaces in contact with said rollers.

4. In a double tapered roller bearing, an inner race member having cylindrical surfaces at the center and at each end thereof, inwardly facing tapered race-ways between said cylindrical surfaces, tapered rollers having their small ends facing inwardly in said race-ways, means for spacing the rollers in each of said race-ways comprising, a ring seating on said central cylindrical surface, a ring seating on one of said end cylindrical surfaces, and spacing bars integrally connecting said rings, and outer race members having tapered inner surfaces in contact with said rollers.

5. In a double tapered roller bearing, a one piece inner race member having spaced inwardly tapered race-ways therein, tapered rollers in said race-ways, means for spacing the rollers in each of said race-ways comprising rings seating on said inner race member at the respective ends of said rollers and bars integrally connecting said rings, and outer race members having tapered inner surfaces in contact with said rollers.

6. In a multiple tapered roller bearing, an inner race member having spaced inwardly facing tapered race-ways therein, tapered rollers in said race-ways, means for spacing the rollers in said race-ways comprising rings seating on said inner race member and bars wedge-shaped in cross section integrally connecting said rings, and outer race members having tapered inner surfaces in contact with said rollers.

KARL L. HERRMANN.